US012570774B2

(12) United States Patent
Fukumoto et al.

(10) Patent No.: US 12,570,774 B2

(45) Date of Patent: Mar. 10, 2026

(54) CYCLOOLEFIN RESIN CURED PRODUCT HAVING OXYGEN BARRIER PROPERTIES

(71) Applicant: RIMTEC Corporation, Tokyo (JP)

(72) Inventors: Naoki Fukumoto, Tokyo (JP); Nobuhito Kamei, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 326 days.

(21) Appl. No.: 18/021,214

(22) PCT Filed: Aug. 25, 2021

(86) PCT No.: PCT/JP2021/031191

§ 371 (c)(1),
(2) Date: Feb. 14, 2023

(87) PCT Pub. No.: WO2022/045204

PCT Pub. Date: Mar. 3, 2022

(65) Prior Publication Data

US 2023/0322978 A1 Oct. 12, 2023

(30) Foreign Application Priority Data

Aug. 28, 2020 (JP) ................................ 2020-144572

(51) Int. Cl.
*C08F 32/08* (2006.01)

(52) U.S. Cl.
CPC .................................. *C08F 32/08* (2013.01)

(58) Field of Classification Search
None
See application file for complete search history.

(56) References Cited

U.S. PATENT DOCUMENTS 4,701,510 A * 10/1987 Minchak ................ C08G 61/02 526/281
4,923,943 A * 5/1990 Hara ...................... C08G 61/08 526/283
5,087,518 A * 2/1992 Shimada ................... B29B 9/12 428/407
6,306,987 B1 * 10/2001 Van Der Schaaf .. B01J 31/2282 556/136
6,310,160 B1 * 10/2001 Kodemura .............. C08F 32/08 524/553
2004/0018364 A1 * 1/2004 Ota ........................ H05B 33/04 428/447
2006/0258828 A1 * 11/2006 Sugawara .............. H05K 1/032 526/308
2009/0321681 A1 * 12/2009 Skuse ...................... C08K 9/04 252/188.28
2010/0051861 A1 3/2010 Inubushi et al.
2010/0288538 A1 * 11/2010 Watkinson ............ C09C 1/0018 174/250
2011/0073901 A1 * 3/2011 Fujita ................... C09D 165/00 257/E23.116
2011/0144292 A1 * 6/2011 Kojima .................. C08G 61/08 526/216
2012/0058332 A1 * 3/2012 Muller .................. D21H 19/20 428/511
2018/0162764 A1 * 6/2018 Kato ...................... C08L 35/00

FOREIGN PATENT DOCUMENTS

CN 103159914 A 6/2013
CN 109943024 A 6/2019
JP 8-143767 A 6/1996
JP 2001-118963 A 4/2001
JP 2001-302888 A 10/2001
JP 2003-003046 A 1/2003
JP 2009-263575 A 11/2009
JP 2010-235699 A 10/2010
JP 2013-48295 A 3/2013
JP 2014136728 A * 7/2014 ............. B32B 15/08
WO 03/062253 A1 7/2003
WO 2008/032743 A1 3/2008
WO WO 2013/175894 A * 1/2016 ........... B32B 15/085

OTHER PUBLICATIONS

Iwabuchi—JPWO 2013-175894 A1—MT—claimed monomers+catalyst—2013 (Year: 2013).*
Iwabuchi—JP 2014-136728 A—MT—tricyclic and pentacyclic monomers in claimed amounts—2014 (Year: 2014).*
Extended (Supplementary) European Search Report dated Sep. 23, 2024, issued in counterpart EP Application No. 21861627.4. (10 pages).
International Preliminary Report on Patentability (Form PCT/IB/373) issued in counterpart International application No. PCT/JP2021/031191 mailed Feb. 28, 2023 with Form PCT/ISA/237. (6 pages).
International Search Report dated Nov. 2, 2021, issued in counterpart International Application No. PCT/JP2021/031191. (3 pages).
Office Action dated Jul. 4, 2025, issued in counterpart EP Application No. 21861627.4. (5 pages).

* cited by examiner

*Primary Examiner* — John Vincent Lawler
(74) *Attorney, Agent, or Firm* — WHDA, LLP

(57) ABSTRACT

Provided is a cycloolefin resin cured product having oxygen barrier properties prepared through bulk polymerization of a polymerizable composition comprising a cycloolefin monomer and a metathesis polymerization catalyst, wherein the cycloolefin monomer includes a norbornene-based monomer (a), the polymerizable composition comprises an antioxidant in an amount of 0.3% by mass or less, and the cycloolefin resin cured product has an oxygen permeability at 23° C. of less than 50 mL/$m^2$·day·atm (100 μm).

12 Claims, No Drawings

CYCLOOLEFIN RESIN CURED PRODUCT HAVING OXYGEN BARRIER PROPERTIES

TECHNICAL FIELD

The present invention relates to a cycloolefin resin cured product having oxygen barrier properties, and more specifically relates to a cycloolefin resin cured product which can demonstrate oxygen barrier properties for a long time.

BACKGROUND ART

Cycloolefin resins are known for their high mechanical strength, high heat resistance, low moisture absorbing properties, high dielectric properties, and the like, and are used in a variety of applications.

For example, Patent Document 1 describes examination of such a cycloolefin resin when used in sealing of semiconductor elements. In the technique disclosed in Patent Document 1, the cycloolefin resin is used in sealing of semiconductor elements utilizing properties of the cycloolefin resin due to low viscosity of its monomer solution, which lead to large freedom in forming, and short-time applicability and curability.

On the other hand, it is known that insufficient oxygen barrier properties are observed in sealing of semiconductor devices in some cases, in which degradation and corrosion of elements inside semiconductor devices are accelerated by oxygen in the air, leading to a reduction in long-term reliability or durability. As a technique of enhancing the oxygen barrier properties of a polyolefin resin, for example, Patent Document 2 describes a technique of reducing oxygen permeability by promoting oxidation of a polyolefin resin in the presence of an oxidation catalyst to trap oxygen. However, while the technique disclosed in Patent Document 2 can reduce the oxygen permeability to some extent, it cannot ensure sufficient oxygen barrier properties required for a sealing material.

RELATED ART DOCUMENTS

Patent Documents

Patent Document 1: JP 2013-48295 A
Patent Document 2: JP 1996-143767 A

SUMMARY OF THE INVENTION

Problem to be Solved by the Invention

The present invention has been made in consideration of such circumstances, and an object of the present invention is to provide a cycloolefin resin cured product which can demonstrate high oxygen barrier properties for a long time, a film having oxygen barrier properties prepared by forming such a cured product, and a polymerizable composition suitably used to form such a cured product.

Means for Solving Problems

The present inventors, who have conducted extensive research, have found that the above object can be achieved by using a norbornene-based monomer (a) as a cycloolefin monomer in a polymerizable composition for forming a cycloolefin resin cured product and controlling the content of an antioxidant in the polymerizable composition to a specific amount or less, and have completed the present invention.

Specifically, the present invention provides a cycloolefin resin cured product having oxygen barrier properties prepared through bulk polymerization of a polymerizable composition comprising a cycloolefin monomer and a metathesis polymerization catalyst, wherein the cycloolefin monomer includes a norbornene-based monomer (a), the polymerizable composition comprises an antioxidant in an amount of 0.3% by mass or less, and the cycloolefin resin cured product has an oxygen permeability at 23° C. of less than 50 $mL/m^2 \cdot day \cdot atm$ (100 μm).

In the cycloolefin resin cured product having oxygen barrier properties according to the present invention, the oxygen permeability at 23° C. is preferably 15 $mL/m^2 \cdot day \cdot atm$ (100 μm) or less.

In the cycloolefin resin cured product having oxygen barrier properties according to the present invention, preferably, the cycloolefin monomer further includes a monocyclic cycloolefin.

In the cycloolefin resin cured product having oxygen barrier properties according to the present invention, the polymerizable composition preferably contains a filler.

In the cycloolefin resin cured product having oxygen barrier properties according to the present invention, the filler is preferably a plate-like filler.

Preferably, the cycloolefin resin cured product having oxygen barrier properties according to the present invention has a surface at least partially including an oxide film.

The present invention also provides a film having oxygen barrier properties prepared by forming any one of the above-mentioned cycloolefin resin cured products having oxygen barrier properties.

The film having oxygen barrier properties according to the present invention preferably includes an oxide film in at least part of at least one of surfaces.

Alternatively, the present invention provides a laminate of a layer of any one of the above-mentioned cycloolefin resin cured products having oxygen barrier properties with a layer made from a different resin or a metal layer.

Furthermore, the present invention provides a polymerizable composition for forming the cycloolefin resin cured product having oxygen barrier properties, the polymerizable composition comprising a cycloolefin monomer and a metathesis polymerization catalyst, wherein the cycloolefin monomer is a norbornene-based monomer (a), and the polymerizable composition comprises an antioxidant in an amount of 0.3% by mass or less.

Effects of Invention

The present invention can provide a cycloolefin resin cured product which can demonstrate high oxygen barrier properties for a long time, a film having oxygen barrier properties prepared by forming such a cured product, and a polymerizable composition suitably used to form such a cured product.

DESCRIPTION OF EMBODIMENTS

The cycloolefin resin cured product having oxygen barrier properties according to the present invention is a cycloolefin resin cured product having oxygen barrier properties prepared through bulk polymerization of a polymerizable composition comprising a cycloolefin monomer and a metathesis polymerization catalyst, wherein the cycloolefin monomer includes a norbornene-based monomer (a), the polymerizable composition comprises an antioxidant in an amount of 0.3% by mass or less, and the cycloolefin resin cured product has an oxygen permeability at 23° C. of less than 50 mL/$m^2$·day·atm (100 μm).

<Polymerizable Composition>

First, the polymerizable composition used for production of the cycloolefin resin cured product having oxygen barrier properties according to the present invention will be described.

The polymerizable composition used for production of the cycloolefin resin cured product having oxygen barrier properties according to the present invention comprises a cycloolefin monomer and a metathesis polymerization catalyst.

The cycloolefin monomer is a compound having a ring structure formed by carbon atoms, the ring having a carbon-carbon double bond.

In the present invention, at least a norbornene-based monomer (a) is used as the cycloolefin monomer.

The norbornene-based monomer (a) can be any compound having a norbornene ring structure, and is not particularly limited. Examples thereof include bicyclic compounds such as norbornene, norbornadiene, vinyl norbornene, and ethylidene norbornene; tricyclic compounds such as dicyclopentadiene and dihydrodicyclopentadiene; tetracyclic compounds such as tetracyclododecene and ethylidene tetracyclododecene; pentacyclic compounds such as tricyclopentadiene; heptacyclic compounds such as tetracyclopentadiene; derivatives thereof having a $C_2$ to $C_{10}$ alkenyl group, a $C_2$ to $C_{10}$ alkynyl group, a $C_1$ to $C_{10}$ alkylidene group, an epoxy group, or an (meth)acrylic group (such as an ethylidene group); and the like. These norbornene-based monomers (a) can be used alone or in combination. As the norbornene-based monomer (a), preferred are the tricyclic compounds, and particularly preferred is dicyclopentadiene because they can further enhance the effects of the present invention. The norbornene-based monomer (a) to be used contains the tricyclic compound, especially dicyclopentadiene in a proportion of preferably 50% by mass or more, more preferably 80 to 95% by mass. When the tricyclic compound is used, it can be suitably used in combination with a derivative thereof other than a tricyclic compound having an ethylidene group such as ethylidene norbornene or with a pentacyclic compound such as tricyclopentadiene, preferably in a proportion of 5 to 20% by mass.

To improve the adhesion of the resulting cured product to substrates (e.g., semiconductor elements when the cycloolefin resin cured product is used as a sealing material for semiconductor elements), preferred derivatives are those having an epoxy group. Examples thereof include 4,5-epoxytricyclo[5.2.1.$0^{2,6}$]deca-8-ene [also referred to as dicyclopentadiene monoepoxide (2,3-DCPME); in this specification, simply referred to as DCPME in some cases], 4,5-epoxy-8-chlorotricyclo[5.2.1.$0^{2,6}$]deca-8-ene, 4,5-epoxy-8-methyltricyclo[5.2.1.$0^{2,6}$]deca-8-ene, 4,5-epoxy-8-trifluoromethyltricyclo[5.2.1.$0^{2,6}$]deca-8-ene, and the like. Among these, DCPME is preferred. The content of the derivative having an epoxy group in the polymerizable composition used in the present invention is preferably 0.1 to 20% by mass, more preferably 0.5 to 10% by mass, still more preferably 1 to 5% by mass.

The content of the norbornene-based monomer (a) in the cycloolefin monomer used in the present invention is not particularly limited, and is preferably 1 to 100% by mass, more preferably 30 to 100% by mass, still more preferably 50 to 100% by mass in 100% by mass of the entire cycloolefin monomer.

In the present invention, a monocyclic cycloolefin may be further used as a cycloolefin monomer in the polymerizable composition. When the monocyclic cycloolefin is also used, the cycloolefin resin cured product has higher crack resistance, higher stretching properties, and more excellent high-temperature durability.

Examples of the monocyclic cycloolefin include, but should not be limited to, cyclobutene, cyclopentene, cyclohexene, cyclooctene, cyclododecene, cyclopentadiene, 1,4-cyclohexadiene, 1,5-cyclooctadiene, and derivatives thereof having a $C_2$ to $C_{10}$ alkenyl group, a $C_2$ to $C_{10}$ alkynyl group, a $C_1$ to $C_{10}$ alkylidene group, an epoxy group, or an (meth) acrylic group (such as an ethylidene group), and the like. The monocyclic cycloolefin is preferably a monocyclic cycloolefin having one or more unsaturated bonds showing metathesis reactivity in the molecule because its use provides higher effects. Examples of the monocyclic cycloolefin include 1,5-cyclooctadiene and derivatives thereof. These monocyclic cycloolefins can be used alone or in combination.

In the cycloolefin monomer used in the present invention, the content of the monocyclic cycloolefin is preferably 5 to 99% by mass, more preferably 10 to 70% by mass, still more preferably 20 to 50% by mass in 100% by mass of the entire cycloolefin monomer. When the content of the monocyclic cycloolefin falls within these ranges, the cycloolefin resin cured product has higher crack resistance and higher stretching properties. Thus, the cycloolefin resin cured product can demonstrate further enhanced temperature-cycle reliability and durability when used as a sealing material for semiconductor devices or the like, for example.

The polymerizable composition used in the present invention may contain a different cycloolefin monomer in addition to the norbornene-based monomer (a) and the monocyclic cycloolefin optionally used.

In the cycloolefin monomer used in the present invention, the content of the different cycloolefin monomer is preferably 50% by mass or less, more preferably 30% by mass or less in 100% by mass of the entire cycloolefin monomer.

The metathesis polymerization catalyst used in the present invention can be any metathesis polymerization catalyst as long as it can ring-opening polymerize the cycloolefin monomer, and known metathesis polymerization catalysts can be used.

The metathesis polymerization catalyst used in the present invention is a complex having a transition metal atom as a central atom to which a plurality of ions, atoms, polyatomic ions, and/or compounds are bonded. As the transition metal atom, atoms of Groups 5, 6, and 8 (Long Periodic Table, hereinafter, the same is applied) are used. Although there is no particular limitation to the atoms of the respective groups, examples of atoms of Group 5 include tantalum, examples of atoms of Group 6 include molybdenum and tungsten, and examples of atoms of Group 8 include ruthenium and osmium. Among these transition metal atoms, preferred are ruthenium and osmium of Group 8. That is, the metathesis polymerization catalyst used in the present invention is preferably a complex having ruthenium or osmium as the central atom, more preferably a complex having ruthenium as the central atom. The complex having ruthenium as the central atom is preferably a ruthenium carbene complex in which a carbene compound is coordinated with ruthenium. Here, the "carbene compound" is a generic name for a compound having a methylene free radical, and refers to a compound having an uncharged divalent carbon atom (carbene carbon) represented by (>C:). Because the ruthenium carbene complex has high catalytic activity during bulk ring-opening polymerization, a high-quality polymer having a low odor derived from unreacted monomers is prepared with high productivity. The ruthenium carbene complex, which is relatively stable to oxygen or moisture in the air and is hardly deactivated, can also be used under the air. These metathesis polymerization catalysts may be used alone or in combination.

Examples of the ruthenium carbene complex include those represented by General Formula (1) or (2) below:

[Chem. 1]

(1)

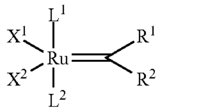

(2)

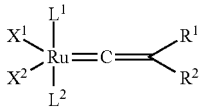

In General Formulae (1) and (2) above, $R^1$ and $R^2$ each independently represent a hydrogen atom, a halogen atom, or a $C_1$ to $C_{20}$ organic group which may contain a halogen atom, an oxygen atom, a nitrogen atom, a sulfur atom, a phosphorus atom, or a silicon atom; and these groups may be substituted, or may be bonded to each other to form a ring. Examples of $R^1$ and $R^2$ bonded to each other to form a ring include indenylidenes which may be substituted, such as a phenylindenylidene group.

Specific examples of the $C_1$ to $C_{20}$ organic group which may contain a halogen atom, an oxygen atom, a nitrogen atom, a sulfur atom, a phosphorus atom, or a silicon atom include $C_1$ to $C_{20}$ alkyl groups, $C_2$ to $C_{20}$ alkenyl groups, $C_2$ to $C_{20}$ alkynyl groups, $C_6$ to $C_{20}$ aryl groups, $C_1$ to $C_{20}$ alkoxy groups, $C_2$ to $C_{20}$ alkenyloxy groups, $C_2$ to $C_{20}$ alkynyloxy groups, $C_6$ to $C_{20}$ aryloxy groups, $C_1$ to $C_8$ alkylthio groups, a carbonyloxy group, $C_1$ to $C_{20}$ alkoxycarbonyl groups, $C_1$ to $C_{20}$ alkylsulfonyl groups, $C_1$ to $C_{20}$ alkylsulfinyl groups, $C_1$ to $C_{20}$ alkylsulfonic acid groups, $C_6$ to $C_{20}$ arylsulfonic acid groups, a phosphonic acid group, $C_6$ to $C_{20}$ arylphosphonic acid groups, $C_1$ to $C_{20}$ alkylammonium groups, $C_6$ to $C_{20}$ arylammonium groups, and the like. These $C_1$ to $C_{20}$ organic groups which may contain a halogen atom, an oxygen atom, a nitrogen atom, a sulfur atom, a phosphorus atom, or a silicon atom may be substituted. Examples of substituents include $C_1$ to $C_{10}$ alkyl groups, $C_1$ to $C_{10}$ alkoxy groups, $C_6$ to $C_{10}$ aryl groups, and the like.

$X^1$ and $X^2$ each independently represent any anionic ligand. The anionic ligand is a ligand having a negative charge when separated from a central metal atom, and examples thereof include halogen atoms, diketonate groups, substituted cyclopentadienyl groups, alkoxyl groups, aryloxy groups, a carboxyl group, and the like.

$L^1$ and $L^2$ represent a heteroatom-containing carbene compound or a neutral electron-donating compound other than the heteroatom-containing carbene compound. The heteroatom-containing carbene compound and the neutral electron-donating compound other than the heteroatom-containing carbene compound are compounds having a neutral charge when separated from the central metal. To improve catalytic activity, preferred is the heteroatom-containing carbene compound. The heteroatom indicates atoms of Groups 15 and 16 in the Periodic Table, and specifically examples thereof include a nitrogen atom, an oxygen atom, a phosphorus atom, a sulfur atom, an arsenic atom, a selenium atom, and the like. Among these, preferred are a nitrogen atom, an oxygen atom, a phosphorus atom, and a sulfur atom, and more preferred is a nitrogen atom to obtain a stable carbene compound.

The heteroatom-containing carbene compound is preferably a compound represented by General Formula (3) or (4) below. To improve catalytic activity, more preferred is a compound represented by General Formula (3) below:

[Chem. 2]

(3)

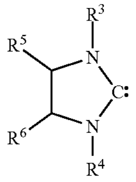

(4)

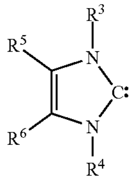

In General Formulae (3) and (4) above, $R^3$, $R^4$, $R^5$, and $R^6$ each independently represent a hydrogen atom; a halogen atom; or a $C_1$ to $C_{20}$ organic group which may contain a halogen atom, an oxygen atom, a nitrogen atom, a sulfur atom, a phosphorus atom, or a silicon atom. Specific examples of the $C_1$ to $C_{20}$ organic group which may contain a halogen atom, an oxygen atom, a nitrogen atom, a sulfur atom, a phosphorus atom, or a silicon atom are the same as those listed in General Formulae (1) and (2) above.

$R^3$, $R^4$, $R^5$, and $R^6$ may also be bonded to each other in any combination to form a ring.

Since the effects of the present invention become more prominent, $R^5$ and $R^6$ are preferably a hydrogen atom. $R^3$ and $R^4$ are preferably an aryl group which may be substituted, more preferably a phenyl group having a $C_1$ to $C_{10}$ alkyl group as a substituent, still more preferably a mesityl group.

Examples of the neutral electron-donating compound include an oxygen atom, water, carbonyls, ethers, nitriles, esters, phosphines, phosphinites, phosphites, sulfoxides, thioethers, amides, imines, aromatics, cyclic diolefins, olefins, isocyanides, thiocyanates, and the like.

In General Formulae (1) and (2) above, $R^1$, $R^2$, $X^1$, $X^2$, $L^1$, and $L^2$ may stand alone and/or may be bonded to each other in any combination to form a multidentate chelating ligand.

Among these compounds represented by General Formula (1) or (2) above, preferred are compounds represented by General Formula (1) as the ruthenium carbene complex used in the present invention, since the effects of the present invention become more prominent. Among these, more preferred are compounds represented by General Formula (5) or (6) below.

General Formula (5) is shown below:

[Chem. 3]

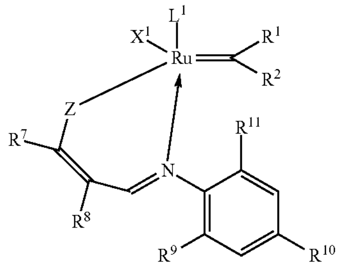

(5)

In General Formula (5) above, Z is an oxygen atom, a sulfur atom, a selenium atom, $NR^{12}$, $PR^{12}$, or $AsR^{12}$; and $R^{12}$ is a hydrogen atom, a halogen atom, or a $C_1$ to $C_{20}$ organic group which may contain a halogen atom, an oxygen atom, a nitrogen atom, a sulfur atom, a phosphorus atom, or a silicon atom. Since the effects of the present invention become more prominent, Z is preferably an oxygen atom.

$R^1$, $R^2$, $X^1$, and $L^1$ are the same as those in General Formulae (1) and (2) above, and may stand alone and/or may be bonded to each other in any combination to form a multidentate chelating ligand. It is preferred that $X^1$ and $L^1$ do not form a multidentate chelating ligand and $R^1$ and $R^2$ be bonded to each other to form a ring, which is more preferably an indenylidene group which may be substituted, still more preferably a phenylindenylidene group.

Specific examples of the $C_1$ to $C_{20}$ organic group which may contain a halogen atom, an oxygen atom, a nitrogen atom, a sulfur atom, a phosphorus atom, or a silicon atom are the same as those in General Formulae (1) and (2) above.

In General Formula (5) above, $R^7$ and $R^8$ are each independently a hydrogen atom, a $C_1$ to $C_{20}$ alkyl group, a $C_2$ to $C_{20}$ alkenyl group, or a $C_6$ to $C_{20}$ heteroaryl group. These groups may be substituted, or may be bonded to each other to form a ring. Examples of substituents include $C_1$ to $C_{10}$ alkyl groups, $C_1$ to $C_{10}$ alkoxy groups, or $C_6$ to $C_{10}$ aryl groups. Although the ring when it is formed by $R^7$ and $R^8$ may be any one of an aromatic ring, an alicyclic ring, and a heterocyclic ring, $R^7$ and $R^8$ preferably form an aromatic ring, more preferably a $C_6$ to $C_{20}$ aromatic ring, still more preferably a $C_6$ to $C_{10}$ aromatic ring.

In General Formula (5) above, $R^9$, $R^{10}$, and $R^{11}$ are each independently a hydrogen atom; a halogen atom; or a $C_1$ to $C_{20}$ organic group which may contain a halogen atom, an oxygen atom, a nitrogen atom, a sulfur atom, a phosphorus atom, or a silicon atom. These groups may be substituted, or may be bonded to each other to form a ring. Specific examples of the $C_1$ to $C_{20}$ organic group which may contain a halogen atom, an oxygen atom, a nitrogen atom, a sulfur atom, a phosphorus atom, or a silicon atom are the same as those in General Formulae (1) and (2) above.

$R^9$, $R^{10}$, and $R^{11}$ are preferably a hydrogen atom or a $C_1$ to $C_{20}$ alkyl group, more preferably a hydrogen atom or a $C_1$ to $C_3$ alkyl group.

Specific examples of the compound represented by General Formula (5) above and a method of producing the same include those described in WO 2003/062253 (JP 2005-515260 T).

General Formula (6) is shown below:

[Chem. 4]

(6)

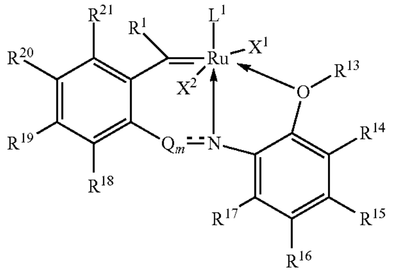

In General Formula (6) above, m is 0 or 1. m is preferably 1, and in this case, Q is an oxygen atom, a nitrogen atom, a sulfur atom, a methylene group, an ethylene group, or a carbonyl group, preferably a methylene group.

In General Formula (6) above,

[Chem. 5]

is a single bond or a double bond, preferably a single bond.

$R^1$, $X^1$, $X^2$, and $L^1$ are the same as those in General Formulae (1) and (2) above, and may stand alone and/or may be bonded to each other in any combination to form a multidentate chelating ligand. Preferably, $X^1$, $X^2$, and $L^1$ do not form a multidentate chelating ligand and $R^1$ is a hydrogen atom.

$R^{13}$ to $R^{21}$ are a hydrogen atom, a halogen atom, or a $C_1$ to $C_{20}$ organic group which may contain a halogen atom, an oxygen atom, a nitrogen atom, a sulfur atom, a phosphorus atom, or a silicon atom. These groups may be substituted, or may be bonded to each other to form a ring. Specific examples of the $C_1$ to $C_{20}$ organic group which may contain a halogen atom, an oxygen atom, a nitrogen atom, a sulfur atom, a phosphorus atom, or a silicon atom are the same as those in General Formulae (1) and (2) above.

$R^{13}$ is preferably a $C_1$ to $C_{20}$ alkyl group, more preferably a $C_1$ to $C_3$ alkyl group. $R^{14}$ to $R^{17}$ are preferably a hydrogen atom, and $R^{18}$ to $R^{21}$ are preferably a hydrogen atom or a halogen atom.

Specific examples of the compound represented by General Formula (6) above and a method for producing the same include those described in WO 2011/079799 (JP 2013-516392 T).

The content of the metathesis polymerization catalyst is preferably 0.005 mmol or more, more preferably 0.01 to 50 mmol, still more preferably 0.015 to 20 mmol relative to 1 mol of the entire cycloolefin monomer used in the reaction.

In the polymerizable composition used in the present invention, the content of the antioxidant (generally, also referred to degradation preventing agent or anti-aging agent) is controlled to 0.3% by mass or less.

The present inventors, who have conducted extensive research to attain a cycloolefin resin cured product having high oxygen barrier properties suitable for use as a sealing material for semiconductors, have focused on an antioxidant usually used to form the cycloolefin resin cured product, and have found that when the amount of the antioxidant to be used is reduced, but not increased, to a specific amount or lower to facilitate oxidation, an oxide film is formed as a result of oxidation, and unexpectedly can reduce oxygen permeability significantly. Thus, high oxygen barrier properties can be demonstrated for a long time.

In the polymerizable composition used in the present invention, the content of the antioxidant is 0.3% by mass or less, preferably 0.2% by mass or less, more preferably 0.1% by mass or less in 100% by mass of the entire polymerizable composition, and particularly preferably the antioxidant is not substantially contained (for example, 0.03% by mass or less).

As the antioxidant in the present invention, examples thereof include compounds known as antioxidants for plastics and rubber, and specifically include a variety of antioxidants such as phenol-based antioxidants, phosphorus-based antioxidants, sulfur-containing compounds, amine-based antioxidants, and the like.

The polymerizable composition used in the present invention may contain a radical generator, a diisocyanate compound, a polyfunctional (meth)acrylate compound, and other optional components as needed.

The radical generator, when heated, generates radicals, by which the radical generator induces a cross-linking reaction in a cycloolefin polymer formed through bulk polymerization. Moieties of the cross-linking reaction induced by the radical generator are mainly carbon-carbon double bonds of the cycloolefin monomer while moieties of saturated bonds may be cross-linked in some cases.

Examples of the radical generator include organic peroxides, diazo compounds, and nonpolar radical generators. Examples of the organic peroxides include hydroperoxides such as t-butyl hydroperoxide, p-menthane hydroperoxide, and cumene hydroperoxide; dialkyl peroxides such as di-t-butyl peroxide, dicumyl peroxide, and t-butylcumyl peroxide; diacyl peroxides such as dipropionyl peroxide and benzoyl peroxide; peroxy ketals such as 2,5-dimethyl-2,5-di(t-butylperoxy)hexane, 2,5-dimethyl-2,5-di(t-butylperoxy)-3-hexyne, and 1,3-di(t-butylperoxyisopropyl)benzene; peroxy esters such as t-butylperoxy acetate and t-butylperoxy benzoate; peroxy carbonates such as t-butylperoxyisopropyl carbonate and di(isopropyl peroxy)dicarbonate; alkylsilyl peroxides such as t-butyltrimethylsilyl peroxide; and the like. Among these, preferred are dialkyl peroxides particularly because they hardly obstruct the metathesis polymerization reaction in the bulk polymerization.

Examples of the diazo compounds include 4,4'-bisazidobenzal(4-methyl)cyclohexanone, 4,4'-diazidechalcone, 2,6-bis(4'-azidobenzal)cyclohexanone, 2,6-bis(4'-azidobenzal)-4-methylcyclohexanone, 4,4'-diazidediphenylsulfone, 4,4'-diazidediphenylmethane, 2,2'-diazidestilbene, and the like.

Examples of the nonpolar radical generators include 2,3-dimethyl-2,3-diphenylbutane, 2,3-diphenylbutane, 1,4-diphenylbutane, 3,4-dimethyl-3,4-diphenylhexane, 1,1,2,2-tetraphenylethane, 2,2,3,3-tetraphenylbutane, 3,3,4,4-tetraphenylhexane, 1,1,2-triphenylpropane, 1,1,2-triphenylethane, triphenylmethane, 1,1,1-triphenylethane, 1,1,1-triphenylpropane, 1,1,1-triphenylbutane, 1,1,1-triphenylpentane, 1,1,1-triphenyl-2-propene, 1,1,1-triphenyl-4-pentene, 1,1,1-triphenyl-2-phenylethane, and the like.

The amount of the radical generator in the polymerizable composition used in the present invention is preferably 0.1 to 10 parts by mass, more preferably 0.5 to 5 parts by mass relative to 100 parts by mass of the entire cycloolefin monomer used.

Examples of the diisocyanate compounds include aromatic diisocyanate compounds such as methylenediphenyl 4,4'-diisocyanate (MDI), toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 1,4-phenylene diisocyanate, tolylene diisocyanate, xylylene diisocyanate (XDI), 1,5-naphthalene diisocyanate, benzidine diisocyanate, o-nitrobenzidine diisocyanate, and dibenzyl 4,4'-diisocyanate; aliphatic diisocyanate compounds such as methylene diisocyanate, 1,4-tetramethylene diisocyanate, 1,6-hexamethylene diisocyanate, and 1,10-decamethylene diisocyanate; alicyclic diisocyanate compounds such as 4-cyclohexylene diisocyanate, 4,4'-methylene bis(cyclohexyl isocyanate), 1,5-tetrahydronaphthalene diisocyanate, isophorone diisocyanate, hydrogenated MDI, and hydrogenated XDI; and polyurethane prepolymers terminated with isocyanate, which are prepared by reacting these diisocyanate compounds with a low molecular weight polyol or polyamine; and the like. In addition, known isocyanurate forms, biuret forms, adduct forms, or polymeric forms of these compounds, which have a polyfunctional isocyanate group and are conventionally used, can be used without limitation. Examples thereof include dimers of 2,4-toluylene diisocyanate, triphenylmethane triisocyanate, tris-(p-isocyanate phenyl)thio phosphite, polyfunctional aromatic isocyanate compounds, polyfunctional aromatic aliphatic isocyanate compounds, polyfunctional aliphatic isocyanate compounds, fatty acid-modified polyfunctional aliphatic isocyanate compounds, block-type polyfunctional isocyanate compounds such as blocked polyfunctional aliphatic isocyanate compounds, polyisocyanate prepolymers, and the like. Among these, suitably used are aromatic diisocyanate compounds, aliphatic diisocyanate compounds, and alicyclic diisocyanate compounds, which are non-block-type polyfunctional isocyanate compounds, because of their availability and ease in handling.

These compounds can be used alone or in combination.

The block-type polyfunctional isocyanate compound indicates an isocyanate compound having at least two isocyanate groups in the molecule which are inactivated at normal temperature through a reaction with an active hydrogen-containing compound. The isocyanate compound usually has a structure having isocyanate groups masked with a blocking agent, examples of the blocking agent including alcohols, phenols, ε-caprolactam, oximes, active methylene compounds, and the like. The block-type polyfunctional isocyanate compound is usually not reactive at normal temperature, leading to high storage stability, while it exhibits its high reactivity due to the isocyanate groups regenerated when heated usually at 140 to 200° C.

It is considered that when used in combination with a polyfunctional (meth)acrylate compound, the diisocyanate compound forms chemical bonds between active hydrogen reactive groups in the molecule and hydroxyl groups present in the polyfunctional (meth)acrylate compound, and as a result, improves adhesion of the cycloolefin monomer to a substrate (e.g., a semiconductor element when the cycloolefin resin cured product is used as a sealing material for semiconductor elements).

These diisocyanate compound may be used alone or in combination. The compounding amount of the diisocyanate compound in the polymerizable composition used in the present invention is preferably 0.5 to 20 parts by mass, more preferably 1 to 15 parts by mass, still more preferably 2 to 10 parts by mass relative to 100 parts by mass of the entire cycloolefin monomer. These ranges are preferred because the resulting cycloolefin resin cured product can have favorable strength and heat resistance while having improved adhesion.

To further improve the adhesion to a substrate (e.g., a semiconductor element when the cycloolefin resin cured product is used as a sealing material for semiconductor elements), a polyfunctional (meth)acrylate compound may be used. It is inferred that when the compound is used in combination with the diisocyanate compound, the function of the diisocyanate compound as an adhesion improver or an adhesion imparting agent is synergistically enhanced. Preferred examples of polyfunctional (meth)acrylate compounds include ethylene glycol dimethacrylate, triethylene glycol dimethacrylate, trimethylolpropane trimethacrylate, and neopentyl glycol dimethacrylate.

These polyfunctional (meth)acrylate compounds may be used alone or in combination. The compounding amount of the polyfunctional (meth)acrylate compound is preferably 0.5 to 20 parts by mass, more preferably 1 to 15 parts by mass, still more preferably 2 to 10 parts by mass relative to 100 parts by mass of the entire cycloolefin monomer to be used. These ranges are preferred because the function of the diisocyanate compound as an adhesion improver or an adhesion imparting agent is synergistically enhanced, resulting in further enhanced adhesion of the cycloolefin resin cured product.

Examples of other optional components include activating agents, activity regulators, elastomers, and the like.

The activating agent is a compound which acts as a cocatalyst for the above-mentioned metathesis polymerization catalyst to improve the polymerization activity of the catalyst. Examples of activating agents to be used include alkylaluminum halides such as ethylaluminum dichloride and diethylaluninum chloride; alkoxyalkylaluminum halides prepared by substituting part of alkyl groups in these alkylaluminum halides with an alkoxy group; organic tin compounds; and the like. The activating agent can be used in any amount, and the amount is preferably 0.1 to 100 mol, more preferably 1 to 10 mol relative to 1 mol of the total metathesis polymerization catalysts used in the polymerizable composition.

As described later, when two or more reaction stock solutions are mixed to prepare a polymerizable composition, the polymerizable composition is injected into a mold, and polymerization is initiated, the activity regulator is used to prevent the polymerization from starting during the injection.

When a compound of a transition metal in Group 5 or 6 in the Periodic Table is used as the metathesis polymerization catalyst, examples of activity regulators include compounds having action to reduce the metathesis polymerization catalyst, and the like. Alcohols, haloalcohols, esters, ethers, nitriles, and the like can be used. Among these, preferred are alcohols and haloalcohols, and more preferred are haloalcohols.

Specific examples of alcohols include n-propanol, n-butanol, n-hexanol, 2-butanol, isobutyl alcohol, isopropyl alcohol, t-butyl alcohol, and the like. Specific examples of haloalcohols include 1,3-dichloro-2-propanol, 2-chloroethanol, 1-chlorobutanol, and the like.

In particular, when a ruthenium carbene complex metathesis is used as the polymerization catalyst, examples of the activity regulator include Lewis base compounds. Examples of the Lewis base compounds include Lewis base compounds containing a phosphorus atom, such as tricyclopentyl phosphine, tricyclohexyl phosphine, triphenyl phosphine, triphenyl phosphite, and n-butyl phosphine; Lewis base compounds containing a nitrogen atom, such as n-butylamine, pyridine, 4-vinylpyridine, acetonitrile, ethylenediamine, N-benzylidenemethylamine, pyrazine, piperidine, and imidazole; and the like. In addition, norbornenes substituted by an alkenyl group, such as vinyl norbornene, propenyl norbornene, and isopropenyl norbornene, are the cycloolefin monomer described above, and also act as the activity regulator. The amount of these activity regulators may be appropriately adjusted depending on the compound to be used.

Examples of the elastomers include natural rubber, polybutadiene, polyisoprene, styrene-butadiene copolymers (SBR), styrene-butadiene-styrene copolymers (SBS), styrene-isoprene-styrene copolymers (SIS), ethylene-propylene-diene terpolymers (EPDM), ethylene-vinyl acetate copolymers (EVA), hydrides thereof, and the like. The viscosity of the elastomer can be adjusted for use by dissolving the elastomer in the polymerizable composition. By adding the elastomer, a composite material molded body having improved impact resistance can be obtained. The amount of the elastomer to be used is preferably 0.5 to 20 parts by mass, more preferably 2 to 10 parts by mass relative to 100 parts by mass of the entire cycloolefin monomer in the polymerizable composition.

The polymerizable composition used in the present invention may also contain a filler as an optional component. A variety of fillers can be used as the filler without limitation, and a particulate inorganic filler is preferably used.

The particulate inorganic filler is preferably that having an aspect ratio of 1 to 2, more preferably that having an aspect ratio of 1 to 1.5. The particulate inorganic filler has a 50% volume cumulative diameter of preferably 0.1 to 50 μm, more preferably 1 to 30 μm, particularly preferably 1 to 10 μm. Here, the aspect ratio indicates the ratio of the average major axis diameter of the filler to the 50% volume cumulative diameter thereof. The average major axis diameter indicates the number average major axis diameter obtained by measuring major axis diameters of 100 filler particles selected at random in an optical microscope image and calculating the arithmetic average value thereof. The 50% volume cumulative diameter is a value determined by measuring the particle size distribution by an X-ray transmission method.

Specific examples of the particulate inorganic filler include calcium carbonate, calcium hydroxide, calcium silicate, calcium sulfate, aluminum hydroxide, magnesium hydroxide, titanium oxide, zinc oxide, barium titanate, silica, alumina, carbon black, graphite, antimony oxide, red phosphorus, a variety of metal powders, clay, a variety of ferrites, SmFeN-based rare earth magnetic powder, NdFeB-based rare earth magnetic powder, SmCo-based rare earth magnetic powder, hydrotalcite, and the like. Among these, preferred are magnesium hydroxide, aluminum hydroxide, silica, and alumina, and particularly preferred are aluminum hydroxide and silica.

The particulate inorganic filler may have a hydrophobized surface. When a hydrophobized particulate inorganic filler is used, aggregation and sedimentation of the particulate inorganic filler in the polymerizable composition can be prevented, and the particulate inorganic filler can be homogeneously dispersed in the resulting cycloolefin resin cured product. As a result, the stretching properties of the cycloolefin resin cured product can be enhanced. Examples of the treatment agent used in the hydrophobization include silane coupling agents such as vinylsilane, titanate coupling agents, aluminum coupling agents, fatty acids such as stearic acid, oils and fats, surfactants, waxes, and the like. The treatment agent, when used, can also be simply compounded with the filler in the polymerizable composition.

A preferred treatment agent is a silane coupling agent having at least one hydrocarbon group having a norbornene structure because the polymerizable composition, even when compounded with the filler, has a low viscosity, has thixotropy (viscosity in a static state) which is unlikely to increase, and can improve the adhesion to a substrate (e.g., a semiconductor element when the cycloolefin resin cured product is used as a sealing material for semiconductor elements). Although the silane coupling agent can also function as a monomer, the silane coupling agent is regarded as a coupling agent in the present invention. Specific examples of such a silane coupling agent include bicycloheptenyltrimethoxysilane, bicycloheptenyltriethoxysilane, bicycloheptenylethyltrimethoxysilane, bicycloheptenylethyltriethoxysilane, bicycloheptenylhexyltrimethoxysilane, bicycloheptenylhexyltriethoxysilane, and the like. Preferred are bicycloheptenylethyltrimethoxysilane and bicycloheptenylhexyltrimethoxysilane.

The content of the silane coupling agent having at least one hydrocarbon group having a norbornene structure is preferably 0.1 to 5% by mass, more preferably 0.3 to 2% by mass, still more preferably 0.5 to 1% by mass in the polymerizable composition used in the present invention.

The compounding amount of the particulate inorganic filler in the polymerizable composition used in the present invention is preferably 10 to 1000 parts by mass, more preferably 100 to 500 parts by mass relative to 100 parts by mass of the cycloolefin monomer.

In addition to the particulate inorganic filler, the polymerizable composition used in the present invention may contain a fibrous inorganic filler. The fibrous inorganic filler is preferably that having an aspect ratio of 5 to 100, more preferably that having an aspect ratio of 10 to 50. The fibrous inorganic filler has a 50% volume cumulative diameter of preferably 0.1 to 50 μm, more preferably 1 to 30 μm.

Specific examples of the fibrous inorganic filler include glass fibers, wollastonite, potassium titanate, Zonolite, basic magnesium sulfate, aluminum borate, tetrapod-shaped zinc oxide, gypsum fibers, phosphate fibers, alumina fibers, whisker-like calcium carbonate, whisker-like boehmite, and the like. Among these, preferred are wollastonite and whisker-like calcium carbonate. The fibrous inorganic filler may also have a hydrophobized surface as in the case of the particulate inorganic filler described above.

Moreover, a plate-like filler is suitably used as a filler compounded in the polymerizable composition used in the present invention. The plate-like filler is a filler having an aspect ratio of 30 to 2,000 in a platy or flat shape. By compounding the plate-like filler, the resulting cycloolefin resin cured product having oxygen barrier properties can have not only high oxygen barrier properties but also high water vapor barrier properties. To further enhance the water vapor barrier properties, the plate-like filler has an aspect ratio of preferably 35 to 1,500, more preferably 40 to 1,000, particularly preferably 45 to 800.

By compounding such a plate-like filler, the cycloolefin resin cured product having oxygen barrier properties can have a water vapor permeability of preferably 10 $g/m^2 \cdot 24$ h (100 μm) or less, which is measured at a temperature of 40° C. and a humidity of 90% RH according to JIS K7129 B (1992). Specifically, the cycloolefin resin cured product having oxygen barrier properties can have a water vapor permeability at a thickness of 100 μm of preferably 10 $g/m^2 \cdot 24$ h or less, more preferably 7 $g/m^2 \cdot 24$ h or less, still more preferably 5 $g/m^2 \cdot 24$ h or less, the water vapor permeability being measured at a temperature of 40° C. and a humidity of 90% RH. The measurement of the water vapor permeability can be performed using a commercially available water vapor permeation analyzer at a temperature of 40° C. and a humidity of 90% RH.

The aspect ratio of the plate-like filler can be calculated by determining the plane average diameter of primary particles of the plate-like filler and the average thickness thereof. Here, the plane average diameter and the average thickness are number average values obtained by measuring diameters and thicknesses in plane directions of 100 plate-like filler particles selected at random with an atomic force microscope and calculating the respective arithmetic average values.

The plate-like filler may be any one of an inorganic filler and an organic filler. Preferred is an inorganic filler. The plate-like filler may be derived from a natural product, may be a natural product subjected to a treatment such as refining, or may be a synthetic product. Specific examples of the plate-like filler include kaolinites such as kaolinite and halloysite; smectites such as montmorillonite, beidellite, nontronite, saponite, hectorite, stivensite, and mica; and vermiculites; chlorites; talc; glass flakes such as E glass or C glass, which are amorphous plate-like particles; and the like. Among these, preferred are smectites and glass flakes. Among smectites, particularly preferred are montmorillonite, mica, and saponite. These can be used alone or in combination. Besides, products prepared by dispersing montmorillonite, mica, or saponite (these are substances having a multilayer structure) in water to separate layers forming montmorillonite, mica, or saponite can also be suitably used. Here, among the substances above, montmorillonite is contained in bentonite as the main component. For this reason, montmorillonite obtained by refining bentonite can be used.

The compounding amount of the plate-like filler in the polymerizable composition used in the present invention is preferably 20 to 50 parts by mass, more preferably 30 to 40 parts by mass relative to 100 parts by mass of the cycloolefin monomer. Control of the compounding amount of the plate-like filler within these ranges above can further enhance the water vapor barrier properties while high oxygen barrier properties are maintained.

The polymerizable composition used in the present invention is prepared by appropriately mixing the above-mentioned components by a known method. The polymerizable composition used in the present invention may be prepared by preparing two or more preparative liquid formulations, and mixing the two or more preparative liquid formulations with a mixing apparatus or the like immediately before formation of the cycloolefin resin cured product. For the preparative liquid formulations, the above-mentioned components are distributed and prepared into two or more solutions such that each of them alone is not capable of bulk polymerization, and when all the solutions are mixed, they can form the polymerizable composition containing the above-mentioned components in predetermined proportions. Examples of a combination of such two or more reaction stock solutions include two combinations (a) and (b) below depending on the type of the metathesis polymerization catalyst used.

(a): The metathesis polymerization catalyst to be used can be a metathesis polymerization catalyst which alone has no polymerization reaction activity while exhibiting polymerization reaction activity when used in combination with the activating agent. In this case, a preparative liquid formulation (solution A) containing the cycloolefin monomer and the activating agent and a preparative liquid formulation (solution B) containing the cycloolefin monomer and the metathesis polymerization catalyst are used, and the polymerizable composition can be prepared by mixing these. Furthermore, a preparative liquid formulation (solution C) containing a cycloolefin monomer but not any of the metathesis polymerization catalyst and the activating agent may be used in combination.

(b): When a metathesis polymerization catalyst which alone has polymerization reaction activity is used, the polymerizable composition can be prepared by mixing a preparative liquid formulation (i) containing the cycloolefin monomer and a preparative liquid formulation (ii) containing the metathesis polymerization catalyst. At this time, the preparative liquid formulation (ii) to be used is usually in the form of a dissolution or dispersion of the metathesis polymerization catalyst in a small amount of an inert solvent. Examples of such an solvent include aromatic hydrocarbons such as toluene, xylene, ethylbenzene, and trimethylbenzene; ketones such as methyl ethyl ketone, cyclopentanone, cyclohexanone, 2-heptanone, and 4-hydroxy-4-methyl-2-pentanone; cyclic ethers such as tetrahydrofuran; diethyl ether, dichloromethane, dimethyl sulfoxide, ethyl acetate, and the like. Preferred are aromatic hydrocarbons, and more preferred is toluene.

The optional components such as the radical generator, the diisocyanate compound, and the polyfunctional (meth) acrylate compound may be contained in any one of the preparative liquid formulations, or may be added in the form of a mixed solution other than the preparative liquid formulations.

Examples of the mixing apparatus used in mixing of the preparative liquid formulations above include collision mixing apparatuses usually used in reaction injection molding, low pressure mixers such as dynamic mixers and static mixers, and the like.

<Cycloolefin Resin Cured Product Having Oxygen Barrier Properties>

The cycloolefin resin cured product having oxygen barrier properties according to the present invention is prepared through bulk polymerization of the above-mentioned polymerizable composition, and has an oxygen permeability at 23° C. of less than 50 mL/m$^2$·day·atm (100 μm). Specifically, in the cycloolefin resin cured product according to the present invention, the oxygen permeability at a thickness of 100 μm at 23° C. is less than 50 mL/m$^2$·day·atm, preferably 15 mL/m$^2$·day·atm or less, more preferably 10 mL/m$^2$·day·atm or less.

It is sufficient that the cycloolefin resin cured product having oxygen barrier properties according to the present invention has an oxygen permeability at 23° C. within these ranges above. To demonstrate significantly high oxygen barrier properties for a long time, the cycloolefin resin cured product preferably has a surface at least partially including an oxide film. For example, it is preferred that the cycloolefin resin cured product according to the present invention be prepared as a cured product in the form of a film having oxygen barrier properties. In this case, preferably, at least part of at least one of surfaces thereof includes an oxide film. The surface of the cured product or at least one of surfaces of the film includes an oxide film in a proportion of more preferably 1 to 100%, still more preferably 50 to 100%, further still more preferably 80 to 100% of the entire area, and particularly preferably includes an oxide film on the entire surface (namely, 100% of the entire area includes an oxide film).

Because the cycloolefin resin cured product having oxygen barrier properties according to the present invention is prepared through bulk polymerization of a polymerizable composition having an antioxidant content reduced to 0.3% by mass or less, the cycloolefin resin cured product is readily oxidized in an oxidation atmosphere (for example, in the air), and an oxide film is spontaneously formed on its surface. Formation of an oxide film may be accelerated by heating at a predetermined temperature. In particular, when oxygen barrier properties are imparted by compounding a considerable amount of the antioxidant, the oxygen barrier properties cannot be maintained after the oxygen absorption limit is reached, and thus, the oxygen barrier properties cannot be maintained at a high level for a long time. In contrast, in the present invention, high oxygen barrier properties can be demonstrated for a long time by an oxide film, which is formed by controlling the content of the antioxidant to a specific amount or less and demonstrates oxygen barrier properties. The thickness of the oxide film is not particularly limited, and is preferably 200 μm or less, more preferably 5 to 100 μm, still more preferably 10 to 50 μm.

The cycloolefin resin cured product having oxygen barrier properties according to the present invention can be formed by any method without limitation. For example, when the cycloolefin resin cured product according to the present invention is prepared as a cured product in the form of a film having oxygen barrier properties, preferred is a method of mixing the two or more preparative liquid formulations above, followed by bulk polymerization and then formation into a film form.

Specific examples of the method of mixing the two or more preparative liquid formulations above, followed by bulk polymerization and then formation into a film form include a method of mixing the two or more preparative liquid formulations above, and applying the resulting mixed solution (polymerizable composition) onto a substrate, followed by bulk polymerization.

Examples of the substrate include, but should not be limited to, materials generally known, such as resins and glass. Specific examples of resins include polyesters such as polyethylene terephthalate, polyethylene naphthalate, and polyarylate; polycarbonates; polyolefins such as polypropylene and polyethylene; polyamides such as nylon; fluorinated resins such as polytetrafluoroethylene; and the like. Preferred are polyesters because of their availability. A preferred shape of the substrate, if made from a resin, is a drum or belt shape. A preferred substrate is a resin film because it is readily available and inexpensive.

The mixed solution (polymerizable composition) is then bulk polymerized by optionally heating to a temperature at which the polymerization catalyst demonstrates activity. The polymerization temperature is preferably 0 to 250° C., more preferably 20 to 200° C. Examples of the heating method include, but should not be limited to, a method of heating on a heating plate, a method of heating under pressure using a press (heat pressing), a method of pressing with a heated roll, a method using a heating furnace, and the like. The time for the polymerization reaction is appropriately determined depending on the amount of the polymerization catalyst and the heating temperature, and is preferably 1 minute to 24 hours.

The cured product in the form of a film prepared through bulk polymerization on the substrate is then peeled off from the substrate to obtain a film having oxygen barrier properties. The cured product in the form of a film can be peeled off from the substrate by any method, and may be peeled off by a worker by hand, or may be peeled off with a machine or the like. The film having oxygen barrier properties thus obtained can be used as a sealing film for sealing a semiconductor element, for example.

Alternatively, in production of the cycloolefin resin cured product having oxygen barrier properties according to the present invention, a film having oxygen barrier properties may be produced, for example, by a method of individually introducing the two or more preparative liquid formulations above to a low pressure mixer, instantaneously mixing these with a dynamic mixer or a static mixer, and bulk polymerizing the mixed solution inside a mold or on a substrate.

In a possible embodiment, for example, when the cycloolefin resin cured product having oxygen barrier properties according to the present invention is used as a sealing material for seating semiconductor elements, instead of the method of preparing a cured product in the form of a film described above, (a) semiconductor element(s) can be sealed by the cycloolefin resin cured product according to the present invention by individually introducing the two or more preparative liquid formulations above to a low pressure mixer, instantaneously mixing these a dynamic mixer or a static mixer, and feeding the mixed solution from the dynamic mixer or static mixer to cover the surface(s) of (a) semiconductor element(s).

When the cycloolefin resin cured product having oxygen barrier properties according to the present invention is prepared as a cured product in the form of a film having oxygen barrier properties, a different layer may be included in addition of a layer formed of the cycloolefin resin cured product according to the present invention. Such a different layer may be appropriately selected depending on the intended use or required properties, and examples thereof include sealing material layers made from heat seal resins, supporting substrate layers, deodorant layers containing a deodorant, surface resin layers, protective layers, and the like.

Furthermore, the cycloolefin resin cured product having oxygen barrier properties according to the present invention may be laminated with a layer made from a different resin or a metal layer to form a laminate. The laminate of a layer of the cycloolefin resin cured product having oxygen barrier properties according to the present invention with a layer made from a different resin or a metal layer can have high oxygen barrier properties as well as high water vapor barrier properties. In this case, preferably, the cycloolefin resin cured product having oxygen barrier properties according to the present invention is prepared as a cured product in the form of a film and laminated with a layer made from a different resin or a metal layer to form a laminate.

Examples of the different resin for forming a layer made from a different resin include, but should not be limited to, acrylic resins, urethane resins, silicone resins, epoxy resins, polyimide resins, and the like. Among these, preferred are epoxy resins because they can further enhance the water vapor barrier properties. The layer made from a different resin can have any thickness, and the thickness is preferably 0.5 to 100 μm, more preferably 1 to 50 μm.

The layer made from a different resin may contain a curing agent, a curing aid, a filler such as calcium carbonate or titanium oxide, a plasticizer, a surfactant (leveling agent), an ultraviolet absorbing agent, a photostabilizer, an antioxidant, a dehydrating agent, an adhesiveness imparting agent, a pot life extender (such as acetylacetone, methanol, and ortho-methyl acetate), a cissing improver, and the like as needed.

Examples of metals for forming the metal layer include copper, gold, silver, stainless steel, aluminum, nickel, chromium, and alloys thereof. Among these, preferred is copper because it can further enhance the water vapor barrier properties. The metal layer can have any thickness, and the thickness is preferably 1 to 35 μm, more preferably 3 to 18 μm.

The laminate of the cycloolefin resin cured product having oxygen barrier properties according to the present invention with the layer made from a different resin or the metal layer can be produced by any method. For a laminate thereof with the layer made from a different resin, the laminate can be produced by the following method, for example: A solution of a resin for forming the layer made from a different resin and the like in a solvent is applied onto a surface of the cycloolefin resin cured product having oxygen barrier properties according to the present invention, and the solvent is removed by drying or the like, followed by curing as needed to form a layer made from a different resin.

Alternatively, the laminate of the cycloolefin resin cured product having oxygen barrier properties with the layer made from a different resin or the metal layer can be produced by the following method, for example: A different resin film or a metal for forming the layer made from a different resin or the metal layer is preliminarily disposed in a mold, the two or more preparative liquid formulations above (two or more liquid formulations for forming the cycloolefin resin cured product) are instantaneously mixed by the above-mentioned method, and the mixed solution is bulk polymerized inside the mold.

In the present invention, the above-mentioned norbornene-based monomer (a) is used as the cycloolefin monomer forming the polymerizable composition, the content of the antioxidant in the polymerizable composition is controlled to 0.3% by mass or less, and such a polymerizable composition is used. Thereby, the cycloolefin resin cured product can have an oxygen permeability at a thickness of 100 μm at 23° C. of less than 50 $mL/m^2 \cdot day \cdot atm$. For this reason, in the present invention, high oxygen barrier properties can be demonstrated. In particular, high oxygen barrier properties can be demonstrated for a long time by an oxide film, which is formed on at least part of the surface by controlling the content of the antioxidant to 0.3% by mass or less and demonstrates oxygen barrier properties. Accordingly, the cycloolefin resin cured product having oxygen barrier properties according to the present invention can be suitably used in applications to a sealing material for electrical and electronic components and applications to a coating material for electrical and electronic components. Specifically, the cycloolefin resin cured product having oxygen barrier properties according to the present invention can be suitably used as a sealing material for a variety of semiconductor devices of resin seal types, a sealing and coating material for capacitors, a sealing and coating material for power modules, a sealing and coating material for coils, and the like, and can effectively prevent degradation and corrosion of electrical and electronic components by oxygen. The cycloolefin resin cured product having oxygen barrier properties according to the present invention, which can effectively prevent degradation and corrosion by oxygen, can be suitably used as a coating material for pump casings and bearings; applications to packages for liquid beverage such as milk, juice, sake, whisky, shochu, coffee, tea, jelly drink, and healthcare drink; applications to packages for seasonings such as seasoning liquids, sauce, soy sauce, dressing, broth, mayonnaise, miso, and grated spices; applications to packages for pasty food products such as jam, cream, chocolate paste, yogurt, and jelly; applications to packages for liquid processed food products such as liquid soup, simmered food, pickles, and stew; applications to packages for solid and liquid chemicals such as pesticides and insecticides; applications to packages for liquid and pasty pharmaceuticals; applications to packages for cosmetics such as skin lotions, cosmetic creams, cosmetic emulsions, hair dressings, and hair colors.

EXAMPLES

Hereinafter, the present invention will be described by way of Examples, but these Examples should not be construed as limitations to the present invention. To be noted, "parts" and "%" are mass-based unless otherwise specified. Tests and evaluations were performed as follows.

<Oxygen Permeability (Initial)>

Using an oxygen permeation analyzer (MOCON oxygen permeation analyzer OX-TRAN2/21, available from Hitachi High-Tech Science Corporation), a cycloolefin resin cured product in the form of a film was measured by a differential pressure method according to JIS K7126-2 at a temperature of 23° C. and a relative humidity of 0% at 1 atm with a circular permeation surface having a diameter of 4.4 cm, and the result of measurement was converted to that at a thickness of 100 μm. Thus, the oxygen permeability (unit: "mL/$m^2$·day·atm (100 μm)") was obtained. The oxygen permeability was calculated from the following expression:

oxygen permeability [mL/$m^2$·day·atm (100 μm)]={value measured by oxygen permeation analyzer [mL/$m^2$·day·atm]×thickness [μm] of sample for measurement}÷100

<Oxygen Permeability (after Heating)>

A cycloolefin resin cured product in the form of a film was heated at 170° C. for 190 hours, and the cycloolefin resin cured product in the form of a film after heated was measured for the oxygen permeability (unit: "mL/$m^2$·day·atm (100 μm)") by the same method as above.

<Water Vapor Permeability (Initial)>

Using a water vapor permeation analyzer (product name "Lyssy L80-5000", available from SYSTECH Instruments Ltd.), a cycloolefin resin cured product in the form of a film was measured by a method according to JIS K 7129-2008 A at a temperature of 40° C. and a humidity of 90% RH at 1 atm with a circular permeation surface having a diameter of 4.4 cm, and the result of measurement was converted to that at a thickness of 100 μm. Thus, the water vapor permeability (unit: "g/$m^2$·24 h (100 μm)") was obtained. The water vapor permeability was calculated from the following expression:

water vapor permeability [g/$m^2$·24 h (100 μm)]={value measured by water vapor permeation analyzer [g/$m^2$·24 h]×thickness [μm] of sample for measurement}÷100

Example 1

As a norbornene-based monomer, 100 parts of RIM monomer (available from ZEON Corporation) containing 90 parts of dicyclopentadiene and 10 parts of tricyclopentadiene was prepared into a preparative liquid formulation (i).

0.4 Parts of a ruthenium catalyst (Zhan1N) represented by General Formula (7) as a metathesis polymerization catalyst and 43.0 parts of triphenyl phosphine were dissolved in 56.6 parts of cyclopentanone to prepare a preparative liquid formulation (ii). In the present example, an antioxidant was not contained in any one of the preparative liquid formulation (i) and the preparative liquid formulation (ii). Thus, the preparative liquid formulation (i), the preparative liquid formulation (ii), and the polymerizable composition prepared by mixing these all contained substantially no (0.03% by mass or less) antioxidant (the same was applied to Examples 2 and 3 described later).

[Chem. 6]

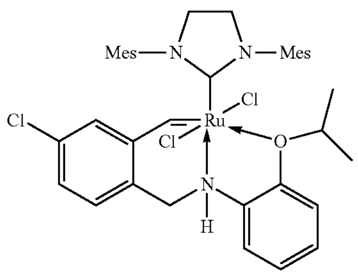

(7)

(where Mes represents a mesityl group.)

The preparative liquid formulation (i) and the preparative liquid formulation (ii) prepared above were then mixed in a mass ratio of the preparative liquid formulation (i) to the preparative liquid formulation (ii) of 100:2.5. The mixed solution was defoamed in vacuum, and then was applied onto an SUS plate as a substrate. The workpiece was heated for 30 minutes in an oven heated to 40° C., and then heated for 60 minutes at 175° C. to give a cycloolefin resin cured product in the form of a cured polymer film having a thickness of 500 μm. After the heating, the resulting cycloolefin resin cured product in the form of a film was measured by FT-IR, revealing that an oxide film was formed on one of surfaces. The oxide film had a thickness of 30 μm, which was measured with a digital microscope available from Keyence Corporation. The resulting cycloolefin resin cured product in the form of a film was then measured for the oxygen permeabilities (initial and after heating) and the water vapor permeability (initial) by the methods described above. The results are shown in Table 1.

Example 2

A cycloolefin resin cured product in the form of a film was prepared in the same manner as in Example 1 except that the preparative liquid formulation (i) used was 100 parts of a norbornene-based monomer containing 93 parts of dicyclopentadiene and 7 parts of ethylidene norbornene, rather than the RIM monomer, and was evaluated in the same manner as above. The results are shown in Table 1. The resulting cycloolefin resin cured product in the form of a film after the heating included an oxide film having a thickness of 30 μm.

Comparative Example 1

A cycloolefin resin cured product in the form of a film was prepared in the same manner as in Example 1 except that a solution prepared by dissolving 0.4 parts of a ruthenium catalyst (Zhan1N) represented by General Formula (7) as a preparative liquid formulation (ii), 14 parts of 2,6-di-t-butyl-p-cresol (BHT, anti-aging agent), and 43 parts of triphenyl phosphine in 42.6 parts of cyclopentanone was used, and was evaluated in the same manner as above. The results are shown in Table 1. In Comparative Example 1, when the preparative liquid formulation (i) and the preparative liquid formulation (ii) were mixed in a mass ratio of 100:2.5, the resulting polymerizable composition contained 0.33% by mass of 2,6-di-t-butyl-p-cresol (BHT, anti-aging agent).

Comparative Example 2

A cycloolefin resin cured product in the form of a film was prepared in the same manner as in Comparative Example 1 except that that the preparative liquid formulation (i) used was 100 parts of a norbornene-based monomer containing 93 parts of dicyclopentadiene and 7 parts of ethylidene norbornene, rather than the RIM monomer, and was evaluated in the same manner as above. The results are shown in Table 1.

TABLE 1

| | | | Example 1 | Example 2 | Example 3 | Comparative Example 1 | Comparative Example 2 |
|---|---|---|---|---|---|---|---|
| | | | Polymerizable composition | | | | |
| Cyclcolefin monomer | RIM monomer | (parts) | 100 | 0 | 100 | 100 | 0 |
| | Dicyclopentadiene | (parts) | 0 | 93 | 0 | 0 | 93 |
| | Ethylidene norbornene | (parts) | 0 | 7 | 0 | 0 | 7 |
| Content of glass flakes in polymerizable composition | | (parts) | 0 | 0 | 33 | 0 | 0 |
| Content of antioxidant in polymerizable composition | | (%) | 0.03 or less | 0.03 or less | 0.03 or less | 0.33 | 0.33 |
| Oxygen permeability (initial) | | ($mL/m^2 \cdot day \cdot atm$ (100 μm)) | 0.2 | 0.1 | 0.5 | 1276.9 | 1302.2 |
| Oxygen permeability (after heating at 175° C. for 190 hours) | | ($mL/m^2 \cdot day \cdot atm$ (100 μm)) | 0.5 | 0.3 | 0.8 | 124.6 | 106.6 |
| Water vapor permeability (initial) | | ($g/m^2 \cdot 24$ h (100 μm)) | 16.0 | 18.9 | 1.5 | 16.9 | 19.3 |

* RIM monomer contains 90 parts of dicyclopentediene and 10 parts tricyclopentediene.

Table 1 shows that the cycloolefin resin cured products prepared from the polymerizable compositions comprising the norbornene-based monomer (a) as the cycloolefin monomer and 0.3% by mass or less of the antioxidant and having an oxygen permeability at 23° C. (initial) of less than 50 $mL/m^2$·day·atm (100 μm) demonstrated low oxygen permeability even after heated at 175° C. for 190 hours, and thus had high oxygen barrier properties (Examples 1 and 2).

In contrast, the cycloolefin resin cured products prepared from the polymerizable compositions comprising more than 0.3% by mass of the antioxidant all demonstrated high oxygen permeability (initial and after heating at 175° C. for 190 hours) and reduced oxygen barrier properties (Comparative Examples 1 and 2).

Example 3

A cycloolefin resin cured product in the form of a film was prepared in the same manner as in Example 1 except that in preparation of the preparative liquid formulation (i), 33 parts of glass flakes having an aspect ratio of 20 as a plate-like filler was compounded with 100 parts of the norbornene-based monomer, and was evaluated in the same manner as above. The oxygen permeability (initial) was 0.5 $mL/m^2$·day·atm (100 μm), the oxygen permeability (after heating at 175° C. for 190 hours) was 0.8 $mL/m^2$·day·atm (100 μm), and high oxygen barrier properties were demonstrated.

The resulting cycloolefin resin cured product in the form of a film was measured for the water vapor permeability at a temperature of 40° C. and a humidity of 90% RH. The water vapor permeability was 1.6 $g/m^2$·24 h (100 μm), and high water vapor barrier properties were also demonstrated.

The invention claimed is:

1. A cycloolefin resin cured product having oxygen barrier properties prepared through bulk polymerization of a polymerizable composition comprising a cycloolefin monomer and a metathesis polymerization catalyst, wherein the cycloolefin monomer includes a norbornene-based monomer (a), the norbornene-based monomer (a) contains a tricyclic compound of 80 to 95% by mass and a pentacyclic compound of 5 to 20% by mass, an antioxidant is not substantially contained in the polymerizable composition, the cycloolefin resin cured product has a surface at least partially including an oxide film of the cycloolefin resin cured product, and the cycloolefin resin cured product has an oxygen permeability at 23° C. of less than 50 mL/m2·day·atm (100 μm).

2. The cycloolefin resin cured product having oxygen barrier properties according to claim 1, wherein the oxygen permeability at 23° C. is 15 $mL/m^2$·day·atm (100 μm) or less.

3. The cycloolefin resin cured product having oxygen barrier properties according to claim 1, wherein the cycloolefin monomer further includes a monocyclic cycloolefin.

4. The cycloolefin resin cured product having oxygen barrier properties according to claim 1, wherein the polymerizable composition contains a filler.

5. The cycloolefin resin cured product having oxygen barrier properties according to claim 4, wherein the filler is a plate-like filler.

6. The cycloolefin resin cured product having oxygen barrier properties according to claim 5, wherein the plate-like filler is glass flake.

7. A film having oxygen barrier properties prepared by forming the cycloolefin resin cured product having oxygen barrier properties according to claim 1.

8. The film having oxygen barrier properties according to claim 7, wherein the film includes an oxide film in at least part of at least one of surfaces.

9. A laminate of a layer of the cycloolefin resin cured product having oxygen barrier properties according to claim 1 with a layer made from a different resin or a metal layer.

10. A polymerizable composition for forming the cycloolefin resin cured product having oxygen barrier properties according to claim 1, the polymerizable composition comprising a cycloolefin monomer and a metathesis polymerization catalyst, wherein the cycloolefin monomer includes a norbornene-based monomer (a), the norbornene-based monomer (a) contains a tricyclic compound of 80 to 95% by mass and a pentacyclic compound of 5 to 20% by mass, and an antioxidant is not substantially contained in the polymerizable composition.

11. The polymerizable composition according to claim 10, wherein the cycloolefin monomer further includes a monocyclic cycloolefin.

12. The polymerizable composition according to claim 10, wherein the polymerizable composition is in the form of two or more preparative liquid formulations each of which alone is not capable of polymerization, and can be formed by combining the preparative liquid formulations.

* * * * *